United States Patent [19]

Fahey

[11] 4,205,005

[45] May 27, 1980

[54] ANTHRAQUINO-CYCLOALKANE DYES

[75] Inventor: Judith B. Fahey, Saint Paul, Minn.

[73] Assignee: Minnesota Mining and Manufacturing Company, Saint Paul, Minn.

[21] Appl. No.: 823,628

[22] Filed: Aug. 11, 1977

[51] Int. Cl.$^2$ .................... C07C 49/76; C09B 3/78
[52] U.S. Cl. .................... 430/72; 260/351
[58] Field of Search .................... 260/666 P, 367, 369, 260/351; 96/1.6

[56] References Cited

U.S. PATENT DOCUMENTS

| | | | |
|---|---|---|---|
| 3,037,861 | 6/1962 | Hogel et al. | 96/1 |
| 4,052,209 | 10/0977 | Huffman et al. | 260/396 N |
| 4,134,764 | 1/1979 | Huffman et al. | 96/1.5 |

FOREIGN PATENT DOCUMENTS 726429  3/1955  United Kingdom .................... 260/351

OTHER PUBLICATIONS

*Diarylquinocyclopropenes and Triquinocyclopropanes,* Robert West & David Zecher, Jol. Amer. Chem. Soc., vol. 92:1, Jan. 14, 1970, pp. 155–161.

The Chemistry of Synthetic Dyes, K. Venkataraman, vol. 1, Academic Press Inc., New York, 1952.
*Triarylcyclopropenium Ions and Diarylcyclopropenones from Trichloropropenium Ion,* Robert West and David C. Zecher and William Goyert, Jol. of American Chemical Society, vol. 92:1, Jan. 14, 1970, pp. 149–154.
*The Synthesis of a Methylenecyclopropene Derivative,* Dr. B. Föhlisch and Dipl–Chem P. Burgle Angew Chem. Untemat, Ed. 4, vol. 3 (1964), No. 10, pp. 699–700.
*Alkylierung Aktivieter Aromaten durch Cyclopropenyliumsalze,* by Dr. Föhlisch and P. Burgle, pp. 58–66 and *Cyclopropenyliumsalze and Chinocyclopropene,* pp. 67–87, Liebigs Amr. Chem. 701 (1967).
*Neue Cyclopropenyliumsalze,* Föhlisch and Burgle, Tetrahedron Letter No. 30, pp. 2661–2664, 1965.

*Primary Examiner*—Winston A. Douglas
*Assistant Examiner*—Raymond K. Covington
*Attorney, Agent, or Firm*—Cruzan Alexander; Donald M. Sell; James B. Marshall, Jr.

[57] ABSTRACT

Dyes of the class consisting of polyanthraquinocycloalkanes and dianthraquinoethenes are useful in giving broad control of the sensitivity of a photoconductor to electromagnetic radiation.

8 Claims, No Drawings

ANTHRAQUINO-CYCLOALKANE DYES

The present invention is directed to novel dyes, to sensitizing dyes for use in photoconductive compositions, and more particularly to dyes of the class consisting of polyanthraquinocycloalkanes and dianthraquinoethenes.

It is generally known that the inherent sensitivity of most photoconductive compounds is mainly in the near U.V. region of the electromagnetic spectrum. In order to increase or extend this sensitivity range, spectral sensitizing dyes have been added to the photoconductive compounds. As indicated in the prior art, e.g., Huffman et al. U.S. Patent Application Ser. No. 556,400, filed Mar. 7, 1975, these sensitizing dyes for photoconductive compositions should possess the following properties: low half voltage-photo decay time; useful solubility range in conventional solvents; high quantum efficiency as an active sensitizer; and high charge acceptance. It is known from this prior art that one class of dyes that exhibit these desired qualities consists of three or four membered carbon rings or ethylenic groups [i.e., $+C=C)_{\overline{n}}$ having at least two quinoid benzene rings bonded thereto, with all remaining ring carbons having valences satisfied as part of a carbonyl moiety.

The terms quino-, and quinoid benzene referred to quinoid rings having one exocyclic double bond satisfied by oxygen (i.e.,

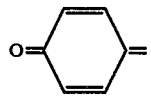

). These quino- groups bonds to the three and four membered rings and ethylenic groups could bear substituents no more electron withdrawing than chlorine in positions ortho to the quinoid benzene carbonyl group (i.e., substituents $X_1$ and $X_2$ could be independently positioned only as shown below):

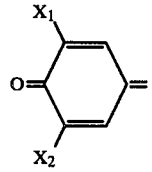

wherein $X_1$ and $X_2$ are groups no more electron withdrawing than chlorine.

Substituents on the quinoid benzene group included alkyl and alkoxy (straight or branched, preferably having $C_1-C_{26}$ groups), phenyl, phenoxy, halophenyl, $C_1-C_{10}$alkyl and alkoxy substituted phenyl, halo substituted straight and branched alkyl (having no more than one halo atom per carbon atom), amino, iodo, bromo, chloro, carboxyl, carbamyl, and amido groups.

The dyes of the present state of the art, even with these various alternative substituents, are still limited in the range of sensitivity to electromagnetic radiation which may be contributed to photoconductive compositions. This result occurs because present art synthesis of the dyes does not allow substituents to be added to the quinoidal structure that would aid in the broader and longer wavelength absorption as well as increase the solubility in organic solvents.

It is therefore one aspect of the present invention to synthesize a new family of dyes which would give broader control of the sensitivity of the photoconductor to electromagnetic radiation.

It is a further aspect of the present invention to improve the solubility to allow higher concentrations of the sensitizer dyes.

These and other aspects of the present invention will be apparent from this technical disclosure.

Many different materials have been suggested as sensitizers for photoconductive systems (see U.S. Pat. No. 3,037,861, June 5, 1962), but the sensitizers used to date have not significantly reduced the sensitivity problems of photoconductive systems and the additives have not greatly improved semiconductive materials. Neither the range of sensitivity nor the speed of such sensitized elements has been altered to the extent accomplished in the practice of this invention. Furthermore, with the increased sensitivity of photoconductive elements in the practice of this invention, novel structures and novel utilities can be found for photoconductive elements which allow their use, for example, in xerographic processes and other electrostatic processes.

In order to sensitize a photoconductive element according to the practice of this invention, a limited class of dyes must be added to a photoconductive binder material. There are a variety of different constructions which can be used for photoconductive elements depending upon the particular properties and response required from the element. At a minimum, of course, there must be a binder material. In general, these are organic polymeric materials of high dielectric strength such as polyvinyl toluene, polystyrene, poly-halostyrene and copolymers thereof, polyvinyl toluene and substituted PVT - butadiene copolymers, polyacrylates and copolymers thereof, epoxy resins, polycarbonate resins. A particularly useful class of binders are the organic photoconductors such as poly-N-vinyl carbazole, polyanthracene pholyvinylacenaphthalene, poly 2,9-methylene fluorene polyvinyl ferrocene, polybenzocarbazole, polybenzoanthracene. In the practice of this invention, the photoconductive layer(s) must be associated with the improved classes of sensitizing dyes, but the structure of many elements will remain otherwise the same as those conventionally used in the art.

The photoconductive layers utilized in the practice of this invention are preferably organic, polymeric, polynuclear thermoplastic resins and their copolymers (e.g., poly(N-vinyl carbazole) or a vinyl carbazole/vinyl acetate copolymer) and the sensitizing dyes used in the practice of this invention. Other sensitizing dyes known in the art (such as those disclosed by German Pat. No. 1,068,115) may be used in conjunction with the present dyes, as well as other additives known to be useful in photoconductive constructions such as film improving agents (e.g., plasticizers, adhesion promoters, hardeners, and other thermoplastics such as epoxy resins and polycarbonates), organic acids to enhance color image formation by oxidation of leuco dyes (e.g., bis(trifluoromethyl-sulfonyl-methane)), photohalogens (e.g., tristribromo-s-triazene), and Lewis acids to aid conduction.

Conductor layers used in conjunction with the photoconductive elements of the present invention can essentially by any layer of material with conductive properties such as a metal coating (e.g., Al, Cu, Ag, Cr, etc.), inorganic metal oxide (e.g., iron oxides, indium oxide, stannous oxide), an inorganic salt (e.g., copper iodides), and electroconductive resins (including particulate-filled resins), such as the polyvinylbenzene pyridium chlorides (c.f. Italian Pat. No. 767,082, and Italian Pat. No. 801,584) and sulfonated polyvinyl toluenes.

The substrate in most constructions can by any support material such as paper, fabric, thermoplastic resin (polyesters, acetates, vinylchlorides, polycarbonates, etc.), polymer matrix, etc. The substrate may be insulative or conductive, with a high or low dielectric constant depending upon the particular imaging process.

Dyes useful in the present invention are those which have (1) two anthraquinoid moieties connected by a 2 or 4 carbon atom ethenic bridging group, and (2) a cyclopropane moiety having at least one anthraquinoid group, the remainder of the exocyclic double bonds being satisfied by anthraquinoid groups, quinoid groups, or at most one exocyclic double bond with oxygen, i.e., =O, present only when two anthraquinoid groups are present on the cyclopropane moiety.

In general the dyes of the present invention may be described by the formulae:

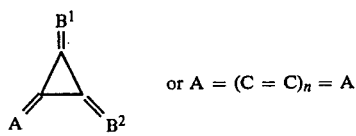

or $A = (C = C)_n = A$ wherein n is 1;
A consists of an anthraquinoid group;
$B^1$ and $B^2$ consist of 1) A, or

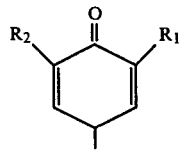

wherein $R_1$ and $R_2$ individually are H or $C_1$ to $C_5$ alkyl; or
(2) $B^1$ is an anthraquinoid and $B^2$ is

"Anthraquinoid group" in the present invention is defined as follows:

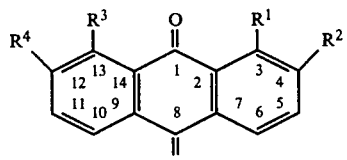

$R^1$, $R^2$, $R^3$, and $R^4$ may be H, I, Cl, Br, or $C_1$-$C_5$ alkyl with symmetrical substitution, and when two of $R^1$-$R^4$ are halogen, the remaining $R^1$-$R^4$ groups are H. Symmetry is preferred but not essential. As noted above, these limitations, which comprise the definition of "anthraquinoid group" in the practice of this invention, apply to individual anthraquinoid groups on the dyes. Individual anthraquinoid groups on a given dye of the present invention may be different, but must remain within these defined limits.

The practice of the present invention may be better understood by the following examples.

EXAMPLE 1

1.78 g of tetrachlorocyclopropene and 1.33 g of $AlCl_3$ were mixed and gently heated to form the $C_3Cl_3{}^+ AlCl_4{}^-$ salt. $CH_2Cl_2$ was added to aid stirring. The mixture was cooled to $-78°$ C., and 4.16 g 9-methoxy anthracene in $CH_2Cl_2$ added slowly over 15 minutes with the temperature maintained below $-40°$ C. The reaction mixture was stirred 2 hours with the temperature maintained between $-30°$ C. and $-20°$ C. After warming to room temperature, the mixture was poured into ice water and the organic layer separated. The water layer was washed with $CHCl_3$, and the combined organics washed with water. The organics were dried and evaporated in vacuo to give 4.2 bis(9-methoxy-10-anthracenyl)cyclopropenone. Recrystallization from chloroform afforded pure orange crystals, m.p. 265°–270° C.; i.r. 1820, 1575; m/e (P+—CO)=438.

1.17 g of bis(9-methoxy-10-anthracenyl)cyclopropenone was dissolved in chlorobenzene, and refluxed for 12 hours with 250 mg of $AlCl_3$. When disappearance of starting materials was complete, the cooled mixture was poured into ice water with a small amount of triethylamine therein, and the organic layer separated. The water layer was washed twice with $CHCl_3$, and the combined organics washed with water, dried with $CaCl_2$, and evaporated to give 0.92 g bis(9-hydroxy-10-anthracenyl)cyclopropenone as a maroon solid, i.r. 1810, 1600 cm.

the cyclopropenone was oxidized using a 2-phase system of benzene and alkaline aqueous $K_3Fe(CN)_6$ to give the dianthraquinocyclopropanone.

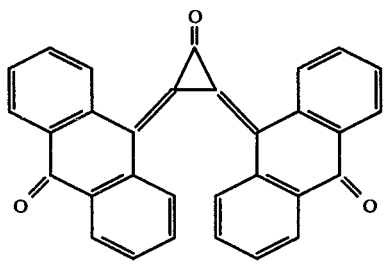

It should be noted that the prior art procedures disclosed in Ser. No. 556,400 can only place a single anthraquinone group on the cyclic ring. That can be done only as the third substituent on an already disubstituted ring. Also, the starting materials which would be used according to that prior art process to attempt to make compounds of the present structure are not stable.

EXAMPLE 2

1.78 g of tetrachlorocyclopropene and 1.33 g of AlCl₃ were mixed and gently heated to form the C₃Cl₃⁺AlCl₄⁻ salt; CH₂Cl₂ was again added and stirred. 4.12 g of 2,6-di-t-butylphenol in CHCl₃ was added gradually over 30 minutes with the temperature maintained between −30° C. and −5° C.; the reaction mixture was stirred 30 minutes with temperature maintained below −5° C. 1.94 g of anthrone in CHCl₃ was added over 20 minutes, and the reaction mixture refluxed for 1 hour. After cooling, the mixture was poured into ice water with a small amount of triethylamine added. The organic layer was separated, the water layer washed with CHCl₃, and the combined organics washed with water. The organics were dried and evaporated in vacuo to yield bis (3,5-di-t-butyl-4-hydroxy-phenyl)cyclopropenylideneanthrone with 80% yield; m/e 638.

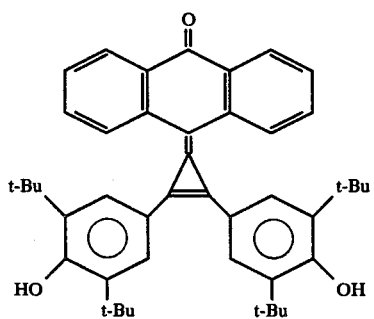

The diarylcyclopropenylideneanthrone was dissolved in benzene and oxidized with potassium ferricyanide (50% excess over necessary two equivalents) in 0.1 N KOH. After 30 minutes stirring, the organic layer was separated, the water layer washed with benzene and the organic layer washed with water to remove traces of K₃Fe(CN)₆. The organics were dried and evaporated to give bis(3,5-di-t-butyl-4-oxo-2,5-cyclohexadien-1-ylidene)9-anthronylidene-cyclopropane with 70% yield; m/e 636; $\lambda_{max}$=780 n.m.

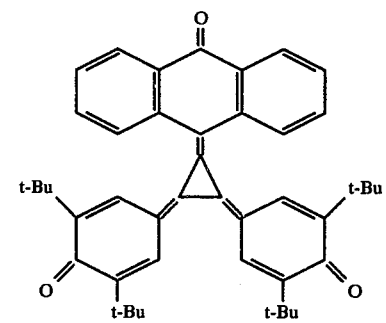

EXAMPLE 3

A solution of dianthraquinocyclopropanone in CHCl₃ was stirred for six hours at room temperature. Dianthraquinoethene was spontaneously formed.

EXAMPLE 4

1.78 g of tetrachlorocyclopropene and 1.33 g of AlCl₃ were mixed and heated to 60° C. to form the trichlorocyclopropenium-tetrachloroaluminate salt. CH₂Cl₂ was added to aid stirring. 6.24 g of 9-methoxyanthracene in 1,2-dichloroethane was added and the reaction mixture refluxed for 12 hours. After cooling to room temperature, the mixture was poured into ice water, the organic layer separated, and the water layer washed with chloroform. The combined organics were washed with water, dried with CaCl₂, and evaporated to give a dark solid. The solid was triturated with benzene to remove bis(9-methoxyanthracenyl)cyclopropenone, and the residual tris(9-methoxyanthracenyl)cyclopropenium chloride was demethylated with hydriodic acid in acetic acid to give 2,3-bis(9-hydroxyanthracenyl)cyclopropen-1-ylidene anthrone in 50% yield; m/e 614.

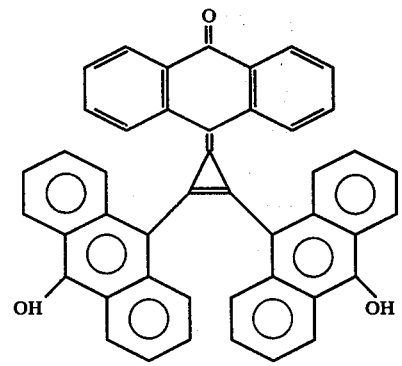

This was oxidized as in Example 1 to give tris(9,10-anthraquino)cyclopropane in 80% yield; m/e 612; $\lambda_{max}$=850 n.m.

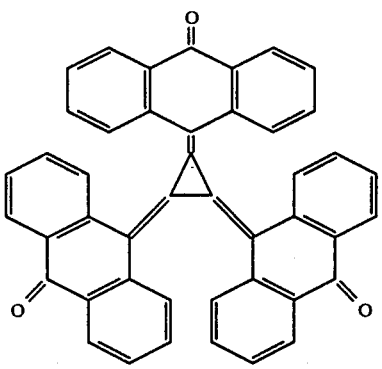

EXAMPLE 5

To a 7% by weight solution of polyvinylcarbazole in an 80/20 by weight blend of chlorobenzene/1,2-dichloroethane was added sufficient diquinoanthraquinocyclopropane to provide a ratio of 50 mg dye/gram of polyvinyl carbazole. The solution was coated on aluminum coated polyester and dried. The sample was placed in the following equipment for testing its efficiency as a photoconductor.

1.0 inch diameter discs were punched out of the photoconductive samples and inserted into the receiving elements of an electrostatic voltmeter (MK Systems Model 169C "Stati-Tester" which electrostatically charges, allows dark decay, exposes the element to light, and measures the photoresponse and records it on a two-dimensional abscissa-ordinant graph). Both negative and positive charging and dark current measurement time for predetermined periods were obtained. Illumination was at an intensity of 15 fc for a predetermined period of time. Such apparatus provided measures of retained charge at any time in the sequence of physical steps and thus measured all changes in the charge during the process.

The above sample produced the folowing results with a 10 sec. negative corona charge, 5 sec. dark decay time, and 10 sec. exposure to tungsten light at 15 foot candles:

610 volts accepted charge
195 volts dark decay
0.30 seconds to ½ voltage
3.6 seconds to 1/20 voltage (20 V residual)

EXAMPLE 6

To a 7% by weight solution of polyvinylcarbazole in an 80/20 by weight blend of chlorobenzene/1,2-dichloroethane was added sufficient tris(9-anthraquino)cyclopropane to provide a ratio of 20 mg dye/gram of polyvinyl carbazole. The solution was coated on a conductive support and dried. The sample was placed in the electrostatic voltmeter.

Samples used in a manner analogous to the previous examples produced the following results with a 10 sec. negative corona charge, 5 sec. dark decay time, and 10 sec. exposure to tungsten light at 15 foot candles:

775 volts accepted charge
125 volts dark decay
0.6 seconds to ½ voltage
6.0 seconds to 1/10 voltage (77V residual)

EXAMPLE 7

To a 7% by weight solution of polyvinylcarbazole in an 80/20 by weight blend of chlorobenzene/1,2-dichloroethane was added sufficient tris(9-anthraquino)cyclopropane to provide a ratio of 5 mg dye/gram of polyvinyl carbazole. The solution was coated on a conductive support and dried. The sample again was placed in the electrostatic voltmeter.

Samples used in a manner similar to the previous examples produced the following results with a 10 sec. negative corona charge, 5 sec. dark decay time, and 10 sec. exposure to tungsten light at 15 foot candles:

490 volts accepted charge
105 volts dark decay
0.75 seconds to ½ voltage
9.0 seconds to 1/20 voltage (25V residual)

The dyes of the present invention may be used in very small amounts in organic polymeric photoconductive binders to have a noticeable sensitizing effect. In the above example, near optimum amounts of 0.5 to 2.0% by weight dyes/polymer are used. Useful effects can be obtained with as little as 0.01% by weight additions of the dyes of the present invention.

What is claimed is:

1. The dyes which can be represented by the formulae:

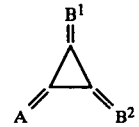

wherein
A consists of an anthraquinoid group;
$B^1$ and $B^2$ consist of
(1) A, or

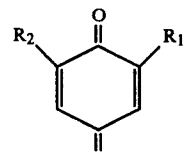

wherein $R_1$ and $R_2$ individually are H or $C_1$ to $C_5$ alkyl; or (2) $B^1$ is an anthraquinoid group and $B^2$ is an exocyclic double bond with oxygen, =O.

2. The dyes of claim 1 wherein each anthraquinoid group individually comprises

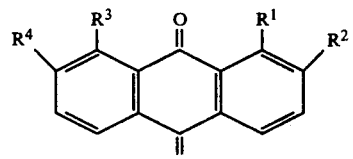

and wherein $R^1$, $R^2$, $R^3$, and $R^4$ are H or $C_1$-$C_5$ alkyl symmetrically attached on the group.

3. The dyes of claim 2 wherein $R^1$, $R^2$, $R^3$, and $R^4$ are all H.

4. The dyes of claim 1 wherein $B^1$ and $B^2$ are each individually

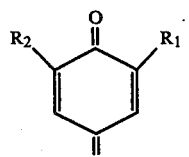
wherein $R^1$ and $R^2$ and H or $C_1-C_5$ alkyl.
5. An organic polymeric photoconductive binder containing the dye of claim 1.
6. An organic polymeric photoconductive binder containing the dye of claim 2.
7. An organic polymeric photoconductive binder containing the dye of claim 3.
8. An organic polymeric photoconductive binder containing the dye of claim 4.